Sept. 1, 1936.  A. RAVA  2,052,796
HIGH TEMPERATURE TORCH
Filed May 15, 1933
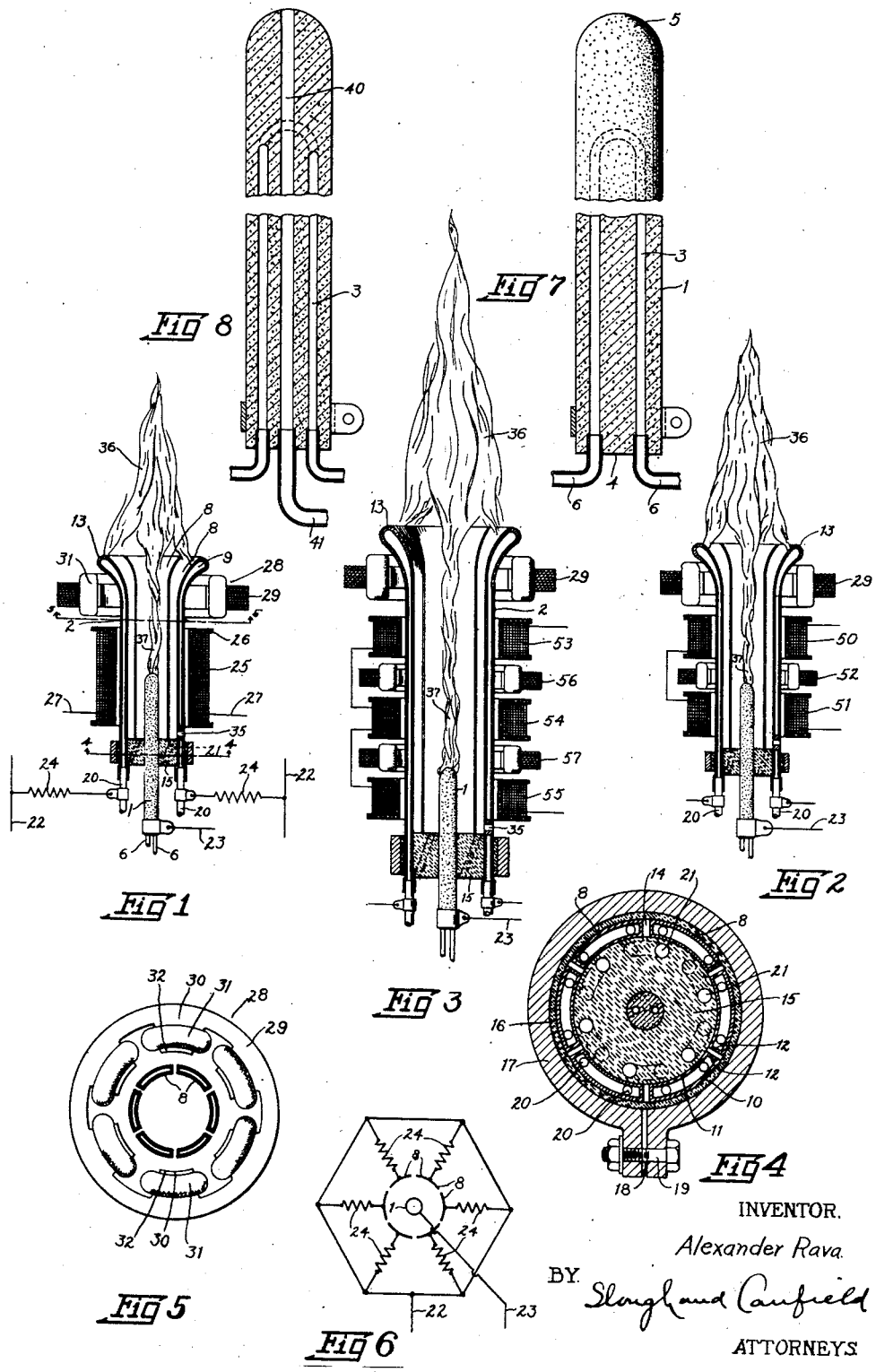
INVENTOR.
Alexander Rava.
BY Slaught and Canfield
ATTORNEYS Patented Sept. 1, 1936

2,052,796

UNITED STATES PATENT OFFICE 2,052,796

HIGH TEMPERATURE TORCH

Alexander Rava, Chicago, Ill.

Application May 15, 1933, Serial No. 671,149

10 Claims. (Cl. 219—8)

This invention relates to methods and means for producing high temperature flames.

Although my invention has numerous applications, it is particularly applicable to the production of non-reducing flames for use in the various metallurgical, chemical, ceramic and other allied arts. An illustrative use is the fusing and melting of refractory material and/or the glazing of the same and/or the depositing thereon of a layer or layers of glazed material, metal, etc.

It is an object of my invention to provide an improved method and means for producing a high temperature flame.

Another object is to provide an improved method and means for producing an electric flame arc.

Another object is to provide a method and means of producing a high temperature flame arc in a unitary torch or like construction.

Another object is to provide an improved method and means for producing a high temperature oxidizing or non-reducing flame.

Another object is to provide an improved method and means for employing a magnetic field to control the production and/or direction of an electric arc flame.

Another object is to provide an improved method and means for producing a high temperature flame by which refractory material may be fused and/or melted without the introduction thereinto of impurities.

Another object is to provide an improved method and means for producing a high temperature flame for glazing refractory material and the like.

Another object is to provide an improved method and means for applying a layer of glaze or of molten metal or the like to refractory or like material.

Another object is to provide an improved electric arc or arc flame electrode.

Other objects will be apparent to those skilled in the art to which my invention appertains.

My invention is fully disclosed in the following description taken in connection with the accompanying drawing, in which:

Fig. 1 is a longitudinal sectional view of a flame producing apparatus or torch embodying my invention and whereby the method of my invention may be practiced;

Fig. 2 is a view similar to Fig. 1 illustrating a modification;

Fig. 3 is a view similar to Fig. 1 illustrating another modification;

Fig. 4 is a cross-sectional view taken from the plane 4 of Fig. 1;

Fig. 5 is a cross-sectional view taken from the plane 5 of Fig. 1;

Fig. 6 is a diagrammatic view illustrating an electric circuit which I may employ in connection with the embodiments of Fig. 1, 2 or 3;

Fig. 7 is a longitudinal sectional view illustrating, to a relatively large scale, an electrode which I may employ and shown to a smaller scale in Figs. 1, 2 and 3;

Fig. 8 is a view similar to Fig. 7 illustrating a modification.

Referring to the drawing, Fig. 1, I have shown at 1 an elongated cylindrical electrode and at 2 a generally cylindrical hollow or tubular electrode, coaxial with the electrode 1, and of internal diameter three or four times that of the external diameter of the electrode 1.

The electrode 1 may be made of various materials, but in the preferred practice of my invention, I choose a material for the electrode 1 in suitable correspondence with the material on which the flame to be produced operates in order that any component material from the electrode 1, which is carried therefrom to the work, will not be in the nature of an impurity therein. For example, where the flame to be produced is to operate upon a refractory having a zirconium dioxide base, the electrode 1 may suitably be made from zirconium dioxide with zirconium metal dust and wire wool, or from the same with a zirconium meal conductor embedded therein, or again from carbon or graphite covered with zirconium carbide glaze and coated with zirconium metal. Such electrodes are fully described in my copending application Serial No. 671,148 filed May 15, 1933, and reference may be had thereto for a more complete description.

The electrode 1, illustrated separately in Fig. 7, is preferably provided with an internal cooling duct 3 extending from the outer end 4 of the electrode to a suitable distance from the tip end 5 of the electrode, and tubes or pipes 6—6 communicate with the duct 3 and may be connected to a suitable supply of circulating cooling medium such as air or water.

The electrode 2, in the form illustrated, comprises a plurality of segments 8—8 preferably formed from electrically conducting but non-magnetic material such as manganese bronze or other suitable alloy or metal, each in the form of an axially extending chamber or flat tube closed at both ends, providing an interior space 9, and having outer and inner partly-cylindrical walls 10 and 11 respectively and radial end walls 12—12. The upper ends, as viewed in the drawing, of the segments are flared outwardly so, that when assembled in the cylindrical unit, the upper end of the hollow cylinder is outwardly flared or of a bell form, providing an upper annular rounded electrode edge indicated generally at 13.

Several segments 8—8, which can be in any desired or suitable number, such as six or more, are supported in cylindrical configuration with each segment circumferentially spaced, as shown at 14, from the adjacent segment to provide air or other proper insulation, such as asbestos, mica, silica, etc., therebetween. The lower ends of the segments are all clamped upon and secured to and supported by a base 15 preferably of refractory material.

The base 15 is of cylindrical form to fit the inner wall of the tubular electrode 2, and a layer of insulating material 16 is placed around the electrode 2 and the layer 16 is clamped upon the segments and the segments clamped upon the base 15 by an outer metal ring 17 the ends of which are clampingly drawn together as at 18 by a bolt 19 in a well known manner. The base 15 furthermore supports the electrode 1, the latter being projected upwardly through a central perforation therein.

Each of the walled segments 8—8 is provided with a pair of tubes or pipes 20—20 projecting into the lower ends thereof, whereby a circulating cooling medium, such as air or water, may be forced through the interior space 9 of the segments, in by one tube and out by the other to carry away heat therefrom.

The base 15 is provided with a plurality of generally axially extending but inclined passageways 21—21 through which may flow, in at the bottom end of the passageway, upwardly therethrough to the upper side of the base 15 and there may impinge upon the inner walls of the segments 8—8, the inclination of the passageways 21 giving to the air a spiral or swirling motion and the air being caused to flow rapidly through the passageways 21 and upwardly through and out of the hollow electrode 2 by the natural draft created by the intense heat generated in the flame 36 in a manner to be described.

The electrodes 1 and 2 are connected to a high voltage electric circuit as indicated in Fig. 6, where 22 and 23 are the supply mains. The main 23 is led directly to the electrode 1, as shown in Fig. 1. The electrode 22 is connected to each of the segments 8—8 of the electrode 2 through separate stabilizing resistances 24—24 or proper inductive reactances, one for each segment 8, the connections being clearly illustrated in the diagramatic view of Fig. 6.

As shown in Fig. 1, the connection to the electrode segments 8 through the stabilizing resistances 24 may be made to lower end portions of the segments projecting downwardly beyond the base 15 or to the circulating pipes 20—20, illustrated in Fig. 1.

At 25, Fig. 1, is illustrated an electro-magnetic winding supported on an insulating spool 26 and surrounding the tubular electrode 2 in the central and lower portions thereof and terminating a substantial distance below the upper end of the electrode. The winding 25 may be connected by mains 27—27 to any suitable source of direct current supply and generates a constant magnetic field within the electrode 2, the direction of which is generally parallel to the axis of the electrodes.

Indicated generally at 28 and shown separately in Fig. 5, is a polyphase electro-magnet comprising an annular field yoke 29 which may be made of laminated iron, a plurality of pairs of pole pieces 30—30, etc., and pairs of energizing windings 31—31 therefor, the pole faces 32—32 of the poles 30—30 facing inwardly radially and disposed in a ring around the inner electrode 2 below the upper annular edge 13 thereof.

By means of an electric circuit not shown, the pairs of windings such as 31—31 are connected to a polyphase current supply, such as a three phase alternating current source, and in a manner which will be well understood to those skilled in the art, the polyphase energization of the windings 31 etc. will produce a rotating magnetic field in the space within the pole faces 32 and therefore within the tubular electrode 2.

In starting up the torch or initiating the flame therefrom, an arc is established between the two electrodes. A preferred mode of striking the arc is to provide a sealed hole or passageway 35 through the walls of one of the segments 8 and to project a metal wire through the hole into contact with the inner electrode and thus momentarily short-circuiting the two electrodes. An arc is thus drawn between them on removing the wire.

The reaction of the arc current upon the magnetic field from the winding 25 causes the arc to rise in the inner electrode and to dispose itself along the axis thereof, ultimately bridging across from the extreme upper tip end of the electrode 1 and the annular edge 13 of the outer electrode, and projecting forwardly out of the outer electrode in the form of a flame as shown at 36, the arc or flame within the electrode being shown at 37.

Furthermore, the current in the arc reacts upon the rotating magnetic field provided by the windings 31 etc. which causes it continually to shift at its point of contact with the annular edge 13. The combined action, therefore, of the rotating and constant or stationary magnetic fields is to prevent the arc from settling upon or "burning in" at any one spot on the outer electrode and causes the arc or flame to form on the upper extreme annular edge of the outer electrode and to continually shift thereon.

The effect of the air flowing rapidly through the outer electrode and out at its bell-shaped upper end, is to carry the flame forward out of the electrode in combination with the effect of the magnetic fields.

A supply current for the flame arc is preferably alternating current at a voltage of 1500 volts or more.

As will now be clear, the flame 36 may be projected upon any work or to perform any operation where an exceedingly high temperature is required. The flame may be employed to glaze refractory ware and other articles and refractory surfaces and to perform various sintering, fusing and melting operations in the various arts; and particularly where the material of the electrode 1 is selected as above referred to, such operations may be performed without introducing into the work substances in the nature of impurities.

As an alternative mode of operation, an electrode, such as illustrated in Fig. 8, may be provided. This electrode, besides being provided with the cooling medium duct 3 above referred to, has a passageway 40 entirely therethrough preferably axially thereof and at the outer end of the electrode it communicates with a supply pipe 41. Through the passageway 49, air, oxygen or other non-combustible gas may be blown under pressure, the gas being charged with oxide or metal dust which upon coming in contact with the flame arc is melted and may, by being projected forwardly into the flame 36, be spread or piled up in a molten layer where desired. Highly refractory oxides, such as zirconium dioxide, or compounds thereof, or dust made from the same material as the refractory being heated, may be employed in this manner.

In my copending application, Serial No. 671,148 filed May 15, 1933, I have described an improved method for making refractory ware and other articles by the application of high temperature to zirconium dioxide combined with specified admixtures of other oxides; and the instant invention may be employed as a source of heat in producing refractory material according to the invention and process in that application.

In Fig. 2 I have illustrated a modification of the torch shown in Fig. 1. In this form, instead of a single electro-magnetic winding 25, two separate direct current windings 50 and 51 are employed and between them a polyphase electro-magnet 52 for producing a rotary magnetic field, the polyphase electro-magnet 29 of Fig. 1 being employed above the uppermost direct current electro-magnet 50.

In Fig. 3 still another modification is shown wherein, besides the polphase electro-magnet 29 adjacent the upper end of the outer electrode, three separate direct current electro-magnets 53, 54 and 55 are employed, spaced apart axially, and between adjacent pairs thereof, polyphase electro-magnets 56 and 57 respectively are disposed.

In both the forms of Fig. 2 and Fig. 3, the joint action of the polyphase and the direct current electro-magnet is to dispose or maintain the arc flame 37 generally along the axis of the outer electrode and to prevent it from burning in at any particular point thereof and to cause it to spread outwardly upon the annular end or tip of the outer electrode and to be projected forwardly therefrom in a flame 36.

The form of the arc flame produced, as herein described, is generally that of a mushroom having a stem disposed axially within the tubular electrode and a head extending above or beyond the same. The production of this form of flame is facilitated by the above-described disposition of the arcing portions of the electrodes, one portion being annular and the other disposed axially thereof and inwardly thereof. Furthermore, a flame of this form facilitates its projection outwardly beyond the tubular electrode and upon the work, and, furthermore, facilitates the applying of refractory material upon the work being operated on inasmuch as it permits the refractory dust which is to be deposited to be discharged outwardly through the stem of the mushroom-formed flame to thoroughly fuse and melt it before being deposited on the work.

By suitably directing the flame upon previously formed refractory articles, their surfaces may be glazed or layers may be deposited thereon, or shapes may be built up by the deposited layers; and where it is desired to form refractory articles from an admixture of refractory material, such as zirconium dioxide and other oxides mixed therewith as set forth in my pending application above referred to, such articles can be first molded from a granular mixture of the oxides and then the mass may be fused and melted to form a solid article by heat applied thereto with the arc flame hereinbefore described.

The flame produced as described is particularly useful where it is desirable to apply intense heat in an oxidizing or non-reducing atmosphere, such, for example, as fusing or melting or glazing refractory oxides, as referred to; and where it is desirable to fuse or melt the work without introducing thereinto impurities from the source of heat.

My invention is not limited to the exact details of construction shown and described, nor to the exact steps of process set forth hereinabove. Many changes and modifications thereof may be made within the scope and spirit of my invention without sacrificing its advantages.

I claim:

1. In a high temperature torch or the like, an outer tubular electrode terminating at the end thereof in an outwardly flaring end portion, an inner electrode supported substantially coaxially thereof, and means for establishing an electric arc between the inner electrode and the outwardly flaring end of the tubular outer electrode.

2. In a high temperature torch or the like, a generally vertically disposed tubular electrode providing an annular arc supporting portion at one end, a head having a portion formed from insulating material in the opposite end of the tubular electrode, the electrode being secured thereto and supported thereby, an inner electrode supported by the head and having an arcing portion in the tubular element inwardly of the annular arcing portion thereof whereby an arc between the two arcing portions may have a stem portion extending substantially axially of the tubular electrode, and a passageway through the head portion for conducting a flow of gas into and upwardly through the tubular electrode and around the arc stem portion, the flow being induced by the elevation of temperature in the tubular electrode effected by the stem arc portion therein.

3. In a high temperature torch or the like, a generally vertically disposed tubular electrode composed of a plurality of longitudinally extending tube segments and providing an arc supporting portion at one end, electro-magnetic means for producing a rotary magnetic field in planes transversely of the tubular electrode and cutting the tube segments, an inner electrode disposed substantally coaxially thereof, and having an arc tip portion axially inwardly of the annular arc portion to cause an arc therebetween to extend generally axially through the tubular electrode, a head having a portion within the tubular electrode at the opposite end thereof and the tube segments being supported on the head and insulated from each other, the inner electrode extending through and supported by the head portion, and a passageway through the head portion to the interior of the tubular electrode to conduct a flow of gas into and through the tubular electrode, the flow being produced by heat in the tubular electrode effected by temperature of the axially extending portion of the arc.

4. In an electric flame torch, a tubular electrode having an annular arcing end portion, an inner electrode within the tubular electrode having an arcing tip portion spaced from the tubular inner wall surface and disposed axially inwardly from the annular arcing portion, means for producing an electric arc between the annular and tip arcing portions, means for providing a magnetic field within the tubular electrode and means for causing gas to flow therethrough to constrain the arc, outwardly axially of the tip, to extend longitudinally of the tubular electrode in the form of an elongated flame stem portion out of contact with the tubular inner wall surface and to cause the flame stem to bridge over to the annular arcing portion, outwardly of the tube end and inwardly concavely, to project the arc in a flame head beyond the tubular end.

5. An arc flame torch as described in claim 4 and in which means is provided for blowing fusible material through the stem of the flame and out through the flame head.

6. An electric flame torch as described in claim 4 and in which a passageway is provided through the inner electrode and means is provided for blowing particles of material therethrough and longitudinally through the flame stem and outwardly through the flame head.

7. An electric flame torch as described in claim 4 and in which means is provided for producing a rotary magnetic field at the annular arcing portion to cause the flame head to bridge over to the annular arcing portion at a plurality of portions thereof concurrently to cause the flame head to be of inwardly concave substantially conical form.

8. A flame torch as described in claim 4 and in which the arcing tip is disposed inwardly axially of the annular arcing portion of the tubular electrode to cause the longitudinally extending stem portion of the flame to be at least as long as the inside diameter of the tubular electrode.

9. In a temperature torch or the like, a tubular electrode providing an annular arc supporting portion at one end, a head at the opposite end of the tubular electrode, the electrode being secured thereto and supported thereby, an inner electrode supported by the head and having an arcing portion in the tubular electrode inwardly of the annular arcing portion thereof whereby an arc between the two arcing portions may have a stem portion extending substantially axially of the tubular electrode, and a passageway through the head for conducting flow of gas into and through the tubular electrode and around the arc stem portion, the flow being induced by the elevation of temperature in the tubular electrode effected by the stem arc portion therin.

10. In a high temperature torch or the like, a tubular electrode composed of a plurality of longitudinally extending tube segments and providing an arc supporting portion at one end, electromagnetic means for producing a rotary magnetic field in planes transversely of the tubular electrode and cutting the tube segments, an inner electrode disposed substantially coaxially thereof and having an arc tip portion axially inward of the annular arc portion to cause an arc therebetween to extend generally axially through the tubular electrode, a head at the opposite end portion of the tubular electrode and the tube segments being supported thereon, means insulating the tube segments from each other, the inner electrode extending through and supported by the head, and a passageway through the head to the interior of the tubular electrode to conduct a flow of gas into and through the tubular electrode, the flow being produced by heat in the tubular electrode effected by temperature of the axially extending portion of the arc.

ALEXANDER RAVA.